United States Patent [19]
Duffy

[11] 3,787,222
[45] Jan. 22, 1974

[54] METHOD OF MAKING SELF-LOCKING THREADED ELEMENT WITH LOCKING PATCH EFFECTIVE OVER A WIDE RANGE OF CLEARANCES

[75] Inventor: Richard J. Duffy, Salem, Mass.
[73] Assignee: USM Corporation, Flemington, N.J.
[22] Filed: Nov. 30, 1971
[21] Appl. No.: 203,130

[52] U.S. Cl.................. 117/21, 10/10 R, 10/10 P, 151/7
[51] Int. Cl............................................. B44d 1/94
[58] Field of Search... 117/21; 151/7; 10/10 R, 10 P

[56] References Cited
UNITED STATES PATENTS

| | | | |
|---|---|---|---|
| 3,498,352 | 3/1970 | Duffy | 151/7 |
| 3,579,684 | 5/1971 | Duffy | 10/10 P |
| 3,554,258 | 1/1971 | Duffy | 117/21 X |
| 3,294,139 | 12/1966 | Preziosi | 151/7 |
| 3,634,577 | 1/1972 | Kull | 151/7 X |
| 2,928,446 | 3/1960 | James et al. | 151/7 |
| 3,061,455 | 10/1962 | Anthony | 151/7 |
| 3,093,177 | 6/1963 | Villo | 151/7 |
| 3,263,726 | 8/1966 | McKay | 151/7 |
| 3,568,746 | 3/1971 | Faroni et al. | 151/7 |

Primary Examiner—William D. Martin
Assistant Examiner—Shrive P. Beck
Attorney, Agent, or Firm—Richard B. Megley et al.

[57] ABSTRACT

Method of making a self-locking threaded element, e.g. a screw, including a strongly adhered plastic body or locking patch on its threaded surface where the locking patch is formed with a special configuration for effective locking engagement over a wide range of clearances between the element and mating threaded surfaces, in which method a stream of fine particles of heat softenable resin is directed against a threaded surface portion of a heated metallic element at a temperature lower than that effective to form a continuous convex curved deposit of resin. The threaded portion is kept in the stream of resin particles for a time sufficient to fill the valleys between threads to an extent of at least one-third in areas of the valleys adjacent the central line of the locking patch and to form thin resin deposits in areas spaced from the central line to give in effect an interupted ridge or bar useful to provide locking action over a wide range of clearances.

5 Claims, 9 Drawing Figures

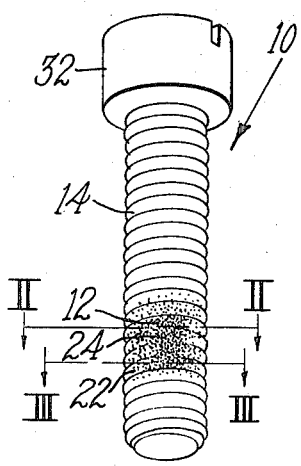
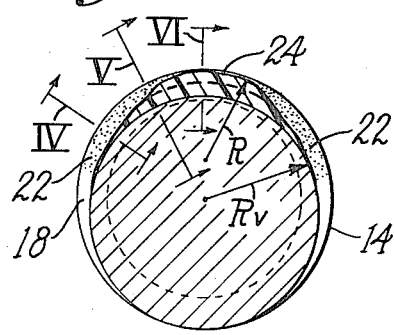
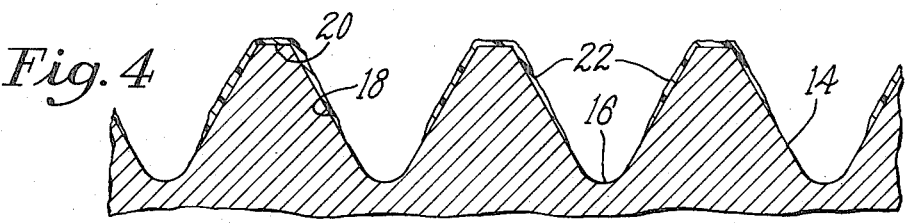
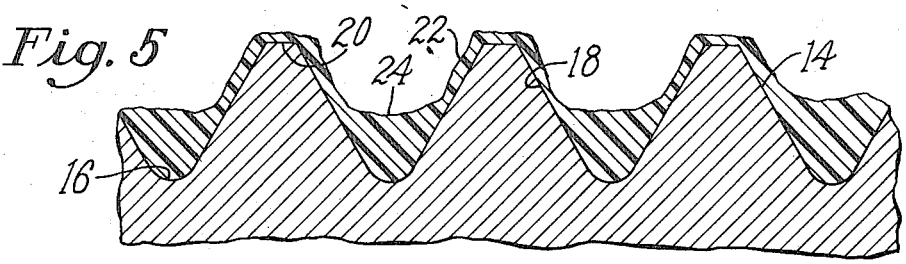
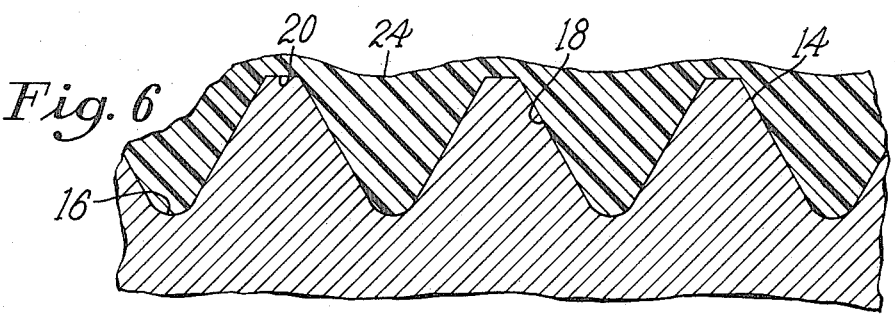

METHOD OF MAKING SELF-LOCKING THREADED ELEMENT WITH LOCKING PATCH EFFECTIVE OVER A WIDE RANGE OF CLEARANCES

BACKGROUND OF THE INVENTION

1. Field of the Invention

This invention relates to improvements in methods of making self-locking threaded elements.

1. Description of the Prior Art

In my prior U.S. Pat. No. 3,498,352, entitled Self-locking Threaded Element which issued Mar. 3, 1970, there is disclosed a self-locking threaded element and method of making in which a stream of fine particles of heat-softenable resin is directed against the heated surface of a threaded element which holds and fuses the resin particles into a continuous retarder patch extending smoothly from one axially extending edge of the patch to the opposite edge of the patch and with smoothly changing thickness of the patch from a maximum thickness midway between the longitudinal edges to minimum thickness adjacent the edges. Ordinarily, the deposit of plastic is so uniform as not greatly to alter the thread appearance.

Self-locking threaded fasteners with locking patches, prepared in accordance with my prior patent, have been eminently satisfactory for most uses and the invention has gone into extensive commercial use. However, the clearance between the surfaces of an external screw thread and a mating internal screw thread particularly with the lower class of thread fit may vary to such an extent that where, for example, the external screw threaded member is at the lower range of allowable manufacturing tolerance and the internal screw threaded member is at the upper end of the range of allowable tolerance, the normal self-locking patch may provide insufficient locking torque, while with another pair of mating screw threaded members where the external screw threaded member is at the upper end of the allowable manufacturing tolerance and the internal screw threaded member is at the lower end of the allowable tolerance, excessive torque may be required for installation and removal of the threaded members.

It is an object of the present invention to provide a self-locking element providing effective locking action between mating threaded members having relatively large variations from normal size.

To this end and in accordance with a feature of the present invention I have provided a method of making a self-locking threaded fastener element including a strongly adhered plastic body having a special configuration which provides effective locking action between threaded members even those having large variations from nominal size.

BREIF DESCRIPTION OF THE DRAWINGS

The invention will be described further in connection with the attached drawings in which:

FIG. 1 is an angular view of one form of self-locking threaded fastener element in accordance with the present invention;

FIG. 2 is a cross-sectional view on a larger scale on the line II—II of FIG. 1;

FIG. 3 is a cross-sectional view on a larger scale on the line III—III of FIG. 1;

FIG. 4 is a fragmentary view in longitudinal section on a much larger scale taken on the line IV-IV of FIG. 2 showing the distribution of the plastic material on the threads of the fastener element near one edge on the plastic deposit;

FIG. 5 is a fragmentary view in longitudinal section on a much larger scale taken on the line V—V of FIG. 2 showing the distribution of the plastic material on the threads of the fastener element intermediate of the longitudinal edge and the longitudinal center line of the plastic deposit.

FIG. 6 is a fragmentary view in longitudinal section on a much larger scale taken on the line VI—VI on FIG. 2 showing the distribution of the plastic material on the threads of the fastener at the longitudinal center line of the plastic deposit;

Figure 8:
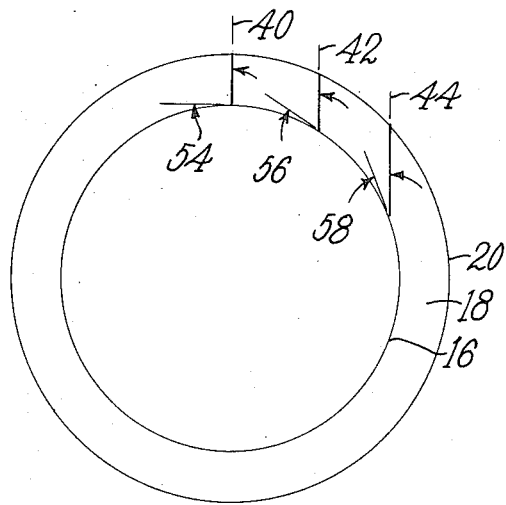
Figure 9:
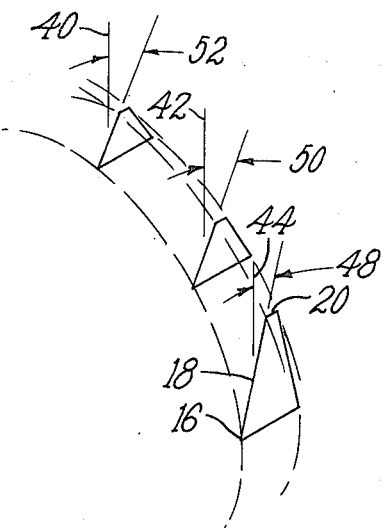

FIG. 8 is a diagram, similar to a cross-sectional view, of a threaded fastener element for purposes of explaining the angles at which resin particles from a stream of resin particles strike the threaded surface; and FIG. 9 is a diagram, similar to an angular cross-sectional view, of a threaded fastener element for purposes of explaining the angles at which the resin particles, from a stream of resin particles, strike the helical bearing surfaces of a threaded member.

DESCRIPTION OF THE PREFERRED EMBODIMENT

The invention will be described in relation to providing a self-locking plastic body on a threaded bolt, but it is to be understood that it is useful in providing a self-locking body on threaded portions of other articles.

A locking-type threaded element 10 shown as a bolt (see FIG. 1) according to the present invention carries an integral continuous deposit or body 12 of tough, resilient resin formed in situ on a selected area of the normal threaded surface 14 of the threaded element by deposition and fusion of fine particles of thermoplastic resin on a heated surface of the threaded element. A film of primer or tying material (not shown) may be provided on the selected area on the surface of the threaded element to aid in deposition of the plastic particles in the course of making and to give superior adhesion between the surface and the resin body.

The resin body 12 covers portions of the valley 16, the inclined helical bearing surfaces 18 and the crests 20 of the threaded surface 14 and is so located as to be compressed between the threaded surface 14 of the element 10 and mating threads of a complementary element with which the threaded element is assembled to provide increased frictional resistance to undesired loosening of the threaded engagement between the threaded element and the complementary element.

As shown in FIGS. 1 to 6 the resin body includes a thin coating layer 22 on the axially extending side portions of the body and substantially thicker central portions 24 in the valleys 16 between threads. This central portion 24 increases rather abruptly in thickness, as shown in FIG. 2, from the general thickness of the coatings 22 on the side portions to a thickness at least about 50 per cent greater than the thickness which would be reached if the surface curved smoothly as extensions of the curves generated by the surface of the resin in the side portions along the center line of the valley (note the broken line in FIG. 2). The broken line may be considered as a "line interpolated from the curvature of the surface of the resin on the side portions along the center line of the valley." A further characterization of the abruptness of increase of the thickness of the resin body in the valley is that the radius of curvature R in central portions 24 of the resin body 12 is actually smaller than the radius of curvature Rv of the surface of the threaded element along the center line of the valley.

Thicker central portions 24 are disposed in the valleys 16 throughout the axial length of the resin body and may be regarded as constituting a ridge interrupted by the crests 20 of the threads. It will be understood that the crests 20 themselves have at least a thin coating of resin (see FIGS. 3 to 6) and that an amount of resin may be deposited on the threaded element such that the higher portions of the ridge extend over the crests of the threads.

This special configuration of resin body is particularly important for giving self-locking action between complementary screw threads where a wide range of clearance may be encountered. That is, where there is a large clearance between the external screw threaded member and the internal screw threaded member, the thickness of the central portion 24 of the resin body 12 in the valleys 16 is adequate to press against the mating screw threads with sufficient force to prevent undesired loosening of the engagement between theaded members. On the other hand, where the clearance between the internal and external screw threaded members is small, the relatively small circumferential extent of the central portion 24 permits the resin to be distorted between internal and external screw threads and in the case of very low clearance to be wiped over into a thinly coated side portion 22 of the resin deposit 12. An important feature of the resin patch of particular value where the clearance is low is that the side portions 22 of the resin body firmly anchor the thicker central portion 24 against displacement from the threaded surface 14 without materially increasing the torque required for installation.

The process of making such locking type fasteners will be described as it is practiced using the apparatus diagrammatically shown in FIG. 7, but it will be understood that other apparatus than that shown may be used, or the process may be carried out by hand. In the apparatus, threaded fastener elements shown as threaded members 10 are conveyed on a carrier through the successive steps of the process. The carrier includes spaced parallel endless belt members 26 traveling on pulley wheels 28 and 30. The threaded members preferably are suspended in vertical position with portions of the heads 32 resting on the spaced parallel moving belt members 26 with depending portions exposed for treatment.

The threaded surface 14 may be given a primer coat either before or after positioning on the carrier. If such coating is applied, any solvent in the primer is evaporated before the threaded fasteners are carried to a heating station. The heating station may be an oven, but preferably is a high-frequency field heating unit 34 designed to heat a succession of threaded members 10 moving continuously past it on the carrier. As shown in the drawing, the coil of the heating unit 34 is elongated in the direction of movement of the threaded members on the carrier to provide adequate heating time to raise the threaded members to the desired temperature. From the heating station the threaded members 10 are next moved to a station at which fine plastic particles are applied. At this station, fine plastic particles suitably as a uniform stream 36 in a jet of gas such as air, are directed at the heated threaded members 10 from a jet nozzle 38 which provides a relatively wide, preferably substantially parallel edge stream through which the threaded members 10 are moved. The dimensions of the nozzle 38 in the direction of movement of the threaded members 10 are chosen to control the time during which a member 10 on the carrier is subjected to a stream of particles and the vertical dimension of the nozzle is chosen to provide the desired axial length of resin deposited on the member. The particles applied are not confined or restrained by a mold or other shaping device but are freely movable into engagement with the crests, helical bearing surfaces and valleys of the threaded surfaces of the threaded members. Because of this fact, the particles deposit a layer in a desirable relationship to the threaded surface both to allow easy installation, i.e., assembly with a complementary threaded element, and strong holding power on the first and subsequent uses. The velocity of the particles in the stream should be kept in the range of about 1 to 25 ft. per second for deposition on the threaded members. Particles are caught and held on the hot surface and are then fused to a continuous coherent mass by the sensible heat of the threaded members 10. When the threaded members 10 and body 12 of plastic material have cooled, the plastic is in the form of a coherent, tough, resilient patch covering crests 20, sides 18, and valleys 16 of the threaded surface.

The procedure is similar to the procedure forming the subject matter of my prior U.S. Pat. No. 3,579,684; but to secure the special configuration of resin body certain changes from the procedure of that patent are used to give the new configuration.

That is, for effective development of a ridged configuration, the temperature of the threaded member at the time the stream of particles is directed against it will be below the minimum temperature at which the continuously convex curved locking bodies are formed, preferably at least about 20° F. below that temperature. The term "continuously convex curved" as employed herein refers to a curve in which the rate of change of curvature of the surface is substantially continuous on each side of the center line of the bodies. Also, it has been found that finer particle size and higher melt viscosity resin than normally employed to make the usual resin body are important to aid in the formation of the new configuration resin deposit.

The novel configuration of the resin body 12 including the ridged central portion 24 is apparently the result of a factor which was masked by the conditions of earlier operations. That is, in the formation of locking resin deposits as heretofore known, resin particles striking on the very hot surface, adhered and melted through almost immediately so that further particles would adhere to the melted resin material and the deposited resin would form a layer smoothly varying in thickness from a minimum at the edges to a maximum at the center.

But, under the conditions used according to the present invention, particles are not as readily caught and do not melt through so rapidly; and a "valley effect" appears which produces the novel ridged configuration.

The action may be understood better by reference to the diagrammatic FIGS. 8 and 9 in which lines 40, 42 and 44 represent the paths of particles in the stream of particles striking the thread surface at the central line, at an intermediate portion and near an edge portion of the threaded surface 14 as viewed from the direction of the stream of particles 36. At the side portion along line 44, the helical bearing surfaces 18 of the threads are at only a slight angle to the path of the particles in the stream due to the fact that the aspect of the thread as shown in FIG. 9 presents only a small angle 48 and the further fact that the path of the particles is nearly tangent to the threaded surface as shown in FIG. 8. Accordingly, the component of movement towards the threaded surface is small while the component tending to sweep the particle past the threaded surface is high so that build up of resin is slow and only a thin deposit of resin is formed on the helical surface as shown in FIG. 4. Particles traveling along the midpoint line 42 and along the central line 40 strike the helical bearing surface 18 at the somewhat greater angles 50 and 52 and therefore, have a somewhat greater chance of being caught and held to form thicker resin deposits as shown in FIGS. 5 and 6. With all of these areas, the chance of particles being caught and held on the crests 20 and helical bearing surface 18 increases with the temperature of the threaded element so that, at higher temperatures within the desired range, there will be progressively greater thickness of resin from a minimum at the sides to a maximum at the central line.

A further factor of importance in determining the build up is the use of very fine particles of resin. The particles should be less than 600 microns and particle size less than 400 microns is preferred. Best results have been obtained with particles in the range of 10 to 200 microns. The fineness of the particles tend to emphasize the deposition behavior discussed above. That is, the ratio of surface area to weight of the resin particles varies inversely as the diameter. Accordingly, the finer particles tend to remain in the stream of air flowing past the threaded surface and this effect is much more pronounced at the side portions than in the central portions so that the relative amount of resin deposited on the central portion to the amount deposited on the side portions is greater with the finer resin particles.

It has always been found that relatively lower particle velocities emphasize the desired deposition behavior. This factor is particularly useful where particles of the larger sizes in the useful range are to be employed.

The "valley effect," referred to above, results from the fact that at the bases of the valleys 16 between threads, the particles cannot slide away as they can from the crest 20 and helical bearing surfaces 18. Thus, as shown in FIG. 8, the surface of the base of the valley 16 at the central line 40 of the threaded element as viewed from the direction of the stream of particles 36 is at a right angle 54 to the stream 36 and provides maximum particle collecting ability. In this area, the first particles striking the surface are caught and adhered to the hot surface; but further resin particles have been observed to pile up on those hot resin particles at a rate faster than they are melted. Smaller particles pile up more effectively than the larger particles and also form a more uniform body of resin after the pile is melted and cooled. At the midpoint along line 42, the angle 56 between the stream 36 and the surface of the base of the valley 16 is somewhat greater so that the ability to collect particles is somewhat less than along the central line 44 but is still substantially greater than the ability of the corresponding helical bearing surface 18. Particles traveling along the line 44 at the edge of the threaded surface are nearly tangential to the threaded surface, approaching the surface at the very small angle 58, and have very little chance of being caught and held. The net effect of this is a variation in ability to catch and hold particles so that the particles collect rapidly at the bases of the valleys 16 along the central line 40 and this ability falls off sharply away from the central line so that a deposit builds up in areas near the central line 40. Also, the particles deposited along the bases of the valleys 16 are heated by the hot walls 18 on both sides of the valleys so that the particles are melted rapidly to catch and hold further particles. Build up of resin in the valleys 16 provides a surface of resin which does not have the angled aspect of the helical bearing surfaces so that the resin builds up progressively in the central portion to form a ridged deposit interrupted by the crests of the threads.

It is to be understood that the above discussion is given to aid in understanding the invention and that patentability is not based upon the correctness of the explanation advanced.

Primers or tying coats which may be applied to the threaded surface to aid in trapping particles from the stream directed against it may be any of a wide variety of heat-softenable resin materials such, for example, as polyamide resins, epoxy resins, resorcinol aldehyde resins and combinations of these. The primer or tying agent may be applied to the threaded surface in a volatile solvent solution. For example, a 10 percent solids solution of an alcohol-solution nylon in denatured alcohol gives good results.

The locking bodies or patches are formed of tough, resilient, heat-softenable resin material. Polyamide polyester and polyurethane resins have been found particularly useful and a preferred polyamide resin in nylon 11. The resin materials are applied in the form of fine particles. The size of the particles to be used depends to some extent on the size of the threaded element to which the patch is to be applied. The smaller the threaded element, the smaller the particles desired. For a ⅜ inch threaded element, a useful range of particle sizes is such that only about 2 percent would be retained on a No. 140 sieve.

It has also been found that an effective primer for combination with the resin of the locking deposit may be obtained using a powder mixture formed by combining a minor proportion, i.e., from about 5 percent to about 35 percent by weight of particles of a primer or tying agent such as the resin materials above noted, with a major portion, i.e., from about 95 percent to about 65 percent by weight of particles of the resin material which makes up the main body of the locking deposit, both percentages being on the weight of the powder mixture. It appears that the primer or tying material fuses at a lower temperature than does the resin material and also that it is more fluid and more capable of wetting the threaded surface so that the heat of the threaded member causes it to fuse and flow into wetting engagement with the threaded surface to provide the desired primer and tying action.

In forming locking deposits on threaded surfaces, the temperature selected will be governed by the softening or melting temperatures of the primer or tying material where used and of the primary resin material. Where the powdered resin is the polyamide, nylon 11, which has a melting point of about 367° F., temperatures in the range of from about 450° F. to about 575° F. have been found satisfactory. It is desirable that the temperature to which the threaded members are heated be such that the sensible heat is sufficient to keep the temperature of the threaded members above about 400° F. for at least about 5 seconds.

In heating of the threaded member, for example, a bolt 10, by a high frequency electric field, for example, at a frequency of 450 kilocycles, a steel threaded bolt can be brought to the desired temperature in from 2 to 3 seconds. In a continuous process, the threaded elements may be passed through the high frequency field at a rate providing the desired heating time.

Figure 7:
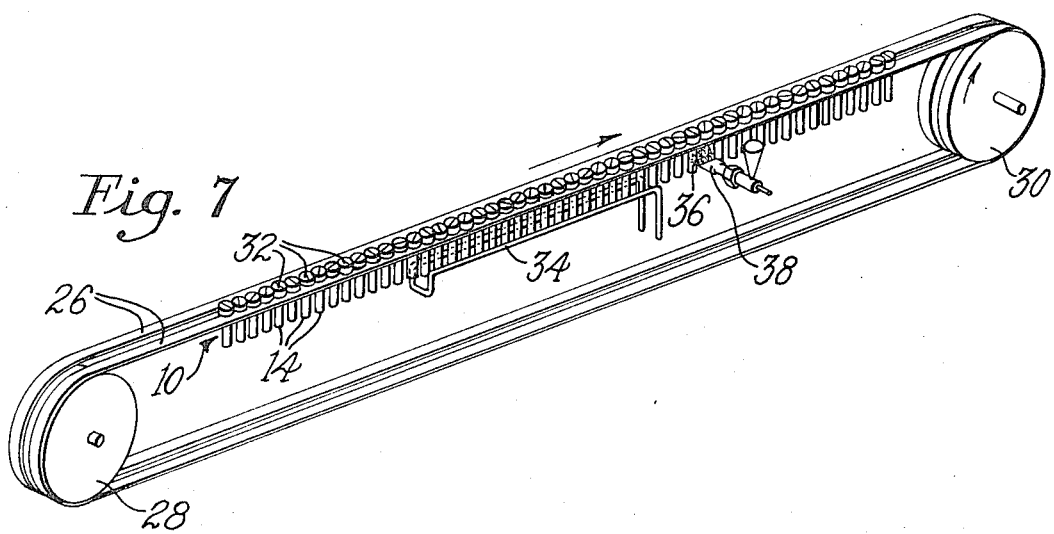
FIG. 7 is a diagrammatic elevational view illustrating apparatus useful for forming a plastic deposit on the threaded surface.

The overall thickness of the resin body is controllable by the nature and rate of supply of particles in the stream, by the temperature of the threaded element and by the time the threaded element remains in the stream of particles. As noted previously, the thickness of the central portion is the primary factor of importance and it is desirable that this portion have a thickness measured at the center line of at least one-third and preferably not more than about the full depth of the valley between threads.

tween the belts leaving the portions to be coated exposed as shown in FIG. 7. A thin layer of primer solution was deposited on exposed portions of the screws on which plastic patches were to be formed. The primer was a 10 percent solids solution in alcohol of an alcohol soluble nylon and an epoxy resin in a ratio of solids of 1:2 parts by weight. The deposited material on the screws was dried leaving very thin substantially continuous primer coats. The screws 10 were then conveyed in proximity to a high-frequency field coil 34 operating at a frequecny of about 450 kc. with a power source of 2 kw. capacity.

The time in which the screws 10 were in the high frequency field was controlled to produce the temperatures shown in the table below. Directly thereafter, the screws 10 were moved by the belts 26 so that the primer coated areas of the screws pass through a laterally directed stream 36 of powdered resin. The heat-softenable primer layer on the surface of the screws caught and held powder particles and the powder particles were fused by heat by the screws to form adherent plastic patches.

After cooling, the plastic patches were smooth, hard, and firmly adherent. The screws were assembled with nuts and measurements were made of the maximum initial installation torque and of minimum removal torque for the first, fifth, and fifteenth removal of the screws from the nuts. The results are listed in the following table.

| Temperature of screw when resin applied | Material | Resin for Locking Patch (resin particles size in microns) | Initial Installation Torque—Maximum (inch-pounds) | Minimum Removal Torque (inch-pounds) | | |
|---|---|---|---|---|---|---|
| | | | | 1st | 5th | 15th |
| 550°F. | Thermoplastic polyurethane resin melting point 428°F. | 10 | 45 | 35 | 25 | 23 |
| 580°F. | Polyamide | 100–600 | 50 | 25 | 25 | 20 |
| 600°F. | " | " | 75 | 50 | 35 | 35 |
| 550°F. | " | 50–200 | 90 | 75 | 60 | 55 |

While as described above, the plastic particles are applied by moving the heated threaded element through a single stream of particles, it will be understood that the patch may be formed by moving the threaded element at a higher rate of speed through a series of streams of particles and that is desired these streams may comprise particles of different ranges of sizes or may be of different materials.

The following example is given as a possible aid in understanding the invention, but it is to be understood that the invention is not limited to the materials, conditions, or procedures of the example.

EXAMPLE

In this example, the screws were of steel of black oxide finish and had a screw size of 5/16 inch -18 UNC - 2; and the nuts were of steel with a cadmium plating and had a screw size of 5/16 inch - 18 UNC - 3.

The screws 10 were disposed with their enlarged head portions 32 resting on the two moving belts 26 and with the threaded portions 14 extending down be- It was observed that where the temperatures of the screws was brought to 600° F. before the screws passed through the stream of resin particles, a coating was formed about 0.004 inch in thickness along its center line and tapering smoothly to the axially extending edges of the bodies. With the polyamide resin particles, where the screws were heated to a temperature of 580° F., very thin coatings on the side portions were formed; but the central area developed a ridge of which the surface rose abruptly from the surface coating on the side portions to reach a thickness in the valleys along the center line to fill the valleys to about three-fourths of the depth of the valleys.

Where the very fine particle size resin was used and the temperature of the screws was only 550° F. at the time of contact with the stream of resin particles, a thin coating was formed on the side portions and a central ridge was formed even more marked than that formed by the polyamide resin. It is noted that with the finer particles, although the installation torque was somewhat higher than that of the locking patches formed with the somewhat coarser resin, the removal torque was very high and fell off only slightly in successive removals.

Having thus described my invention what I claim as new and desire to secure by letters Patent of the United States is:

1. In a method of providing a threaded portion of an article with a self-locking element comprising an adhered body of normally hard, tough, resilient thermoplastic resin, said method including the steps of heating the threaded portion to a temperature above the softening point of said resin, thereafter, directing a stream of fine particles of said resin at a selected area of said threaded portion while said threaded portion is at a temperature above said softening point, catching resin particles from said stream by softening them and causing them to adhere to said threaded portion by heat from said threaded portion progressively to build up a deposit of said resin, fusing adhered particles to coalesce them to a substantially continuous body of resin, and cooling said body of resin to harden it to a solid body resistant to displacement and effective to give a locking action when a complementary thread member is assembled with said threaded portion, the improvement in which said resin particles have a size less than 600 microns, the temperature of the threaded portion when exposed to said stream of resin particles is at least about 20° F. below the minimum temperature effective to form a continuously convex curved deposit of resin from said stream of particles, and gives a low rate of build up of resin deposit on the helical bearing surfaces and crests of said threads relative to the rate of build up of resin deposit at the base of said valleys in areas adjacent the central line of the threaded portion taken from the direction of said stream of particles, and said threaded portion remains in said stream of resin particles for a time sufficient to fill areas of said valleys adjacent said central line to an extent of from about one-third up to about the full depth whereby, deposited resin forms thin side portions and forms thicker portions in said valleys in areas adjacent said central line, the surfaces of said thicker portions rising abruptly above lines interpolated from the curvature of the surface of the resin on said side portions, the radius of curvature of the surface of said thicker portions in the planes approximately including the center lines of the base of the valleys being smaller than the radius of curvature in said planes at the thread surface.

2. The method of providing a self-locking element as defined in claim 1 in which said threaded portion is brought to a temperature which will remain above about 400° F. for at least about 5 seconds after first contact with said stream of resin particles and said resin particles have a particle size of less than 400 microns.

3. The method of providing a self-locking element as defined in claim 2 in which said resin particles have a size of from 10 to 200 microns.

4. The method of providing a self-locking element as defined in claim 2 in which a resin primer coat is disposed on the surface of said threaded portion before heating said threaded portion.

5. The method of providing a self-locking element as defined in claim 2 in which said stream is a mixture of a major portion of fine particles of said normally hard thermoplastic and a minor portion of a heat-softenable tying agent, and said tying agent is fused on the surface of said threaded portion by heat from the surface of said threaded portion to wet said portion and to aid in building up and adhere deposits of said normally hard thermoplastic resin on the surface of said threaded portion.

* * * * *